(12) United States Patent
Münster et al.

(10) Patent No.: US 9,032,372 B2
(45) Date of Patent: May 12, 2015

(54) RUNTIME ENVIRONMENT AND METHOD FOR NON-INVASIVE MONITORING OF SOFTWARE APPLICATIONS

(75) Inventors: Michael Münster, Dreieich (DE); Oguzhan Özkut, Darmstadt (DE)

(73) Assignee: Software AG, Darmstadt (DE)

( * ) Notice: Subject to any disclaimer, the term of this patent is extended or adjusted under 35 U.S.C. 154(b) by 324 days.

(21) Appl. No.: 13/591,760

(22) Filed: Aug. 22, 2012

(65) Prior Publication Data

US 2013/0111450 A1    May 2, 2013

(30) Foreign Application Priority Data

Oct. 28, 2011   (EP) ..................................... 11187125

(51) Int. Cl.
*G06F 9/44* (2006.01)
*G06F 9/45* (2006.01)
*G06F 11/36* (2006.01)

(52) U.S. Cl.
CPC .................................. *G06F 11/3612* (2013.01)

(58) Field of Classification Search
USPC .................................................. 717/124–135
See application file for complete search history.

(56) References Cited

U.S. PATENT DOCUMENTS

| | | | |
|---|---|---|---|
| 6,598,181 B1 | 7/2003 | Pennell | |
| 6,836,780 B1 | 12/2004 | Opitz et al. | |
| 7,672,957 B2 | 3/2010 | Cotichini et al. | |
| 7,757,217 B2 * | 7/2010 | Sivaram | 717/128 |
| 8,037,457 B2 * | 10/2011 | Stefanov | 717/128 |
| 8,359,592 B2 * | 1/2013 | Duplessis et al. | 717/174 |
| 2002/0103658 A1 | 8/2002 | Angal et al. | |
| 2002/0199172 A1 * | 12/2002 | Bunnell | 717/128 |
| 2003/0056200 A1 * | 3/2003 | Li et al. | 717/128 |
| 2003/0204588 A1 | 10/2003 | Peebles et al. | |
| 2006/0041866 A1 * | 2/2006 | Sivaram | 717/124 |
| 2007/0124465 A1 | 5/2007 | Malloy et al. | |
| 2007/0245320 A1 | 10/2007 | Cotichini | |
| 2007/0283331 A1 | 12/2007 | Pietrek | |
| 2008/0120153 A1 | 5/2008 | Nonemacher et al. | |
| 2008/0127109 A1 * | 5/2008 | Simeon | 717/128 |
| 2008/0129557 A1 | 6/2008 | Kong | |
| 2008/0215399 A1 | 9/2008 | Katircioglu et al. | |

(Continued)

FOREIGN PATENT DOCUMENTS

AU     002008203105 A1     1/2010

OTHER PUBLICATIONS

U.S. Appl. No. 11/674,047, Cotichini et al., filed Feb. 12, 2007.
U.S. Appl. No. 11/205,363, Sivaram, filed Aug. 17, 2005.

*Primary Examiner* — Don Wong
*Assistant Examiner* — Marina Lee
(74) *Attorney, Agent, or Firm* — Nixon & Vanderhye, P.C.

(57) ABSTRACT

Certain example embodiments of the present invention relate to a runtime environment for non-invasive monitoring of software applications. The runtime environment (10) is configured to: (a) during execution of at least one software application (20) within the runtime environment (10), identify a function call (25) to be executed by the at least one software application (20); and (b) generating monitoring data relating to the identified function call (25).

16 Claims, 5 Drawing Sheets

(56) References Cited

U.S. PATENT DOCUMENTS

| | | |
|---|---|---|
| 2008/0235080 A1 | 9/2008 | Chess et al. |
| 2010/0211933 A1 | 8/2010 | Kiel et al. |
| 2011/0047622 A1* | 2/2011 | Myles et al. .................... 726/26 |
| 2012/0042306 A1* | 2/2012 | Kawahito et al. ............. 717/151 |
| 2012/0227056 A1* | 9/2012 | Ralston et al. ................ 719/312 |
| 2013/0073837 A1* | 3/2013 | Li et al. ......................... 712/222 |
| 2013/0074056 A1* | 3/2013 | Gounares et al. ............. 717/152 |
| 2013/0111450 A1* | 5/2013 | Munster et al. ............... 717/127 |

* cited by examiner

RUNTIME ENVIRONMENT AND METHOD FOR NON-INVASIVE MONITORING OF SOFTWARE APPLICATIONS

This application claims priority to EP Application No. 11 187 125.7, filed 28 Oct. 2011, the entire contents of which is hereby incorporated by reference.

1. TECHNICAL FIELD

The present invention relates to a runtime environment and a method for non-invasive monitoring of software applications.

2. BACKGROUND AND SUMMARY

Modern enterprises typically rely on complex software applications to run their mission-critical processes, such as controlling and steering manufacturing machinery, operating network or web-based computing environments, or driving business processes with the help of an underlying IT infrastructure.

Monitoring such complex software applications is an important and difficult technical task in order to assure that the applications operate as desired. To this end, it may be desirable to collect monitoring data concerning the operation of the software application, so that the collected data can then be used to analyse, evaluate and control e.g. performance aspects, network bandwidth usage, or even exceptional runtime situations. However, typical software applications in place in many enterprises were not originally designed to provide monitorable data to monitoring products.

In the prior art, a number of approaches are known for extracting relevant data from an existing software application for monitoring, analysis and other purposes. This comprises e.g. debugging techniques such as disclosed in U.S. Pat. No. 6,598,181 B1 and US 2006/0041866 A1, legacy system analysis techniques such as disclosed in U.S. Pat. No. 6,836,780 B1 and US 2007/0245320 A1 or the analysis of business process performance such as disclosed in US 2008/0120153 A1 and US 2008/0219557 A1.

However, all known techniques have a drawback in that they rely in some way or the other on the software application under investigation to provide the relevant data to be monitored. Typically, the software application is required to use a dedicated application programming interface (API), so that data can be extracted from the application, or the data must be manually extracted from SQL or other databases. As a result, a common disadvantage of the known techniques is that the developer has to change the existing application in order for it to provide the desired data or the desired data must already exist in the application database or database interface. Therefore, older applications without special interfaces typically cannot provide relevant data with the state of the art technologies, at least not without substantial changes to the application code. In another field of technique, debugger and tracing tools are able to view and access application data, however, debugger and tracing tools do not provide the capability to automatically extract the data relevant for monitoring complex software applications.

It is therefore the technical problem underlying the present invention to provide an approach for monitoring software applications that at least partly overcomes the above explained disadvantages of the prior art.

This problem is according to one aspect of the invention solved by a runtime environment for non-invasive monitoring of software applications. In the embodiment of claim 1, the runtime environment is adapted for:

a. during execution of at least one software application within the runtime environment, identifying a function call to be executed by the at least one software application; and b. generating monitoring data relating to the identified function call (25).

As it is known in the prior art, software applications may require after compilation a runtime environment to execute (e.g. an ABAP execution engine, a COBOL runtime, a JAVA virtual machine or a Natural runtime). A runtime environment can be understood as a "virtual processor" (CPU) on which a software application can be executed, wherein the runtime environment may provide additional libraries in order to emulate a physical computing system underlying the application. Typically, vendors of programming languages also provide suitable runtime environments to execute applications written in the respective language. For example, the C and C++ programming languages are typically designed to run on a physical processor (CPU), while the programming languages JAVA, C#, ABAP, COBOL and Natural are designed to run on a virtual processor, i.e. a runtime environment.

In this context, the present invention provides an enhanced runtime environment which allows for extracting relevant data for monitoring purposes in a non-invasive manner, i.e. without the need to change or otherwise adapt the software application under investigation. More precisely, when the software application is executed by the runtime environment, the software application typically executes a series of commands or function calls. The runtime environment of the invention identifies such function calls and generates monitoring data relating to the identified function call. Importantly, since the monitoring data is generated by the runtime environment itself, i.e. without the cooperation of the software application under investigation, the software application does not even have to be aware of the additional monitoring data generation. In particular, the software application does not have to be adapted in order to be monitored ("non-invasive monitoring").

In one aspect of the present invention, the generating of monitoring data by the runtime environment may comprise generating runtime information from the group comprising: an identifier of the entity calling the at least one function call, an address of the entity calling the at least one function call, a timestamp and/or an identifier of the function call (e.g. the name of the function call). Accordingly, the generated monitoring data may be enriched with additional information such as runtime information, e.g. but not limited to: current date and time of the call and/or the user id of the caller. The additional information about the current state of the execution environment will allow a better detailed analysis later on. This aspect relates to a scenario where the identified function call does not comprise any function parameters (as opposed to the scenarios described further below). In this case, only the generated additional runtime information relating to the function call (which is preferably generated by an analytic engine; see further below) may be comprised in the monitoring data.

In another aspect of the invention, the function call may comprise at least one function parameter. In this case, the generating of monitoring data by the runtime environment may comprise generating a copy of the at least one function parameter, wherein the function parameter copy is usable for monitoring the at least one software application. Since the parameters of a function call are typically used to pass data between the individual functions of a software application (so-called data flow), this data, i.e. the respective copy thereof, can be used for monitoring the behavior and state of the software application. Advantageously, since the function parameters are copied by the runtime environment during execution of the software application, the software application is not aware of this data extraction and in particular, the existing application does not need to be changed. In yet another aspect of the present invention, also the monitoring data comprising the function parameter copy may be enriched with additional runtime information (see the scenario further above).

Preferably, the runtime environment is adapted for generating the function parameter copy before executing the function call. Accordingly, before the actual function call is executed, the relating function parameters (whose values are provided by the caller of the function) are copied in order to provide an unbiased copy of the function parameters for monitoring purposes.

In a particularly preferred embodiment of the runtime environment of the invention, the runtime environment is adapted for generating a second copy of the at least one function parameter after the function call has been executed, wherein the second function parameter copy is usable for identifying at least one function parameter that was changed and/or added during the execution of the function call. Accordingly, the runtime environment may copy the function parameters twice, i.e. a first time before the execution of the function call, and a second time thereafter. This way, any parameters/parameter values changed during the execution of the function call may be identified and made subject to monitoring. In summary, the monitoring data generated by the runtime environment may comprise runtime information (as explained further above), the function parameter copy generated before execution of the function call, the second function parameter copy generated after execution of the function call, or any combination thereof.

In one aspect of the invention, the runtime environment may be adapted for forwarding the generated monitoring data to an analytic engine for monitoring the at least one software application.

Additionally or alternatively, the runtime environment is further adapted for generating the monitoring data only if at least one predefined filter property is satisfied, wherein the at least one predefined filter property defines: an identifier of the function call, whether a specific function parameter is present in the function call and/or whether a specific function parameter has a predefined value. Accordingly, the generating of runtime information and/or the duplication of function parameter data can be controlled in the runtime environment by means of filter properties, in order to keep the overhead that may be introduced by the additional copy operations at a reasonable limit. Preferably, the above-described filtering is controlled by an analytic engine of the invention (see further below for a more detailed explanation of the analytic engine). Moreover, the analytic engine may also be in charge of generating the additional runtime information described further above, of removing unneeded function parameters from the output according to a predefined configuration, of concatenating function parameters (if needed) and/or of applying mathematical functions (such as add, sub, mul, div, . . . ) to the parameter values. Generally, it is preferably also a decision of the analytic engine whether the parameter(s) is/are useful according the filter criteria.

In other words, the analytic engine may be considered as the control unit of the present invention. The tasks of the analytic engine may be, among others, filtering function parameters, generating additional useful static parameters as well as dynamic parameters according the configuration, deleting unneeded parameters from the output, applying mathematical operations to the parameter values, concatenating string parameters, adding constant values, manipulating parameters according the configuration and/or changing parameter types for the output (e.g. "integer" may be cased to "double").

As a simple example, a function call may have a string parameter "A" and a string parameter "B". According the predefined configuration, the analytic engine will concatenate the parameters "A" and "B" to "C" and forward "C" to the output. The parameters "A" and "B" are according to the configuration unneeded and will not be forwarded to the output.

Furthermore, the runtime environment may be further adapted for copying at least one entry of a memory of an underlying computer system in which the at least one software application has written the at least one function parameter. Typically, during execution within the runtime environment, the software application stores its function parameters in the memory, which is required for the target, and the execution jumps to a new location in the same application or into a different application. At the new location, the data from the memory will be read and used for further processing. Similarly, after execution of the function call, the application typically stores new data in the memory as return value(s). Afterwards, the call instruction returns to the original location where it came from. At the next step the new data can be used for the further execution of the application. In the above aspect of the invention, the runtime environment reads the memory in order to obtain the copy/copies of the function parameter(s).

The present invention is also directed to a method for non-invasive monitoring of software applications, wherein the method comprises the following steps performed by a runtime environment: during execution of at least one software application within the runtime environment, identifying a function call to be executed by the at least one software application; and generating monitoring data relating to the identified function call. Further advantageous modifications of embodiments of the method of the invention are defined in further dependent claims.

Lastly, the present invention also provides a computer program comprising instructions for implementing any of the above described methods.

3. SHORT DESCRIPTION OF THE DRAWINGS

In the following detailed description, presently preferred embodiments of the invention are further described with reference to the following figures.

4. DETAILED DESCRIPTION

The present invention provides an enhanced runtime environment that allows for extracting data relevant for monitoring purposes from a software application executing within the runtime environment.

Figure 1:
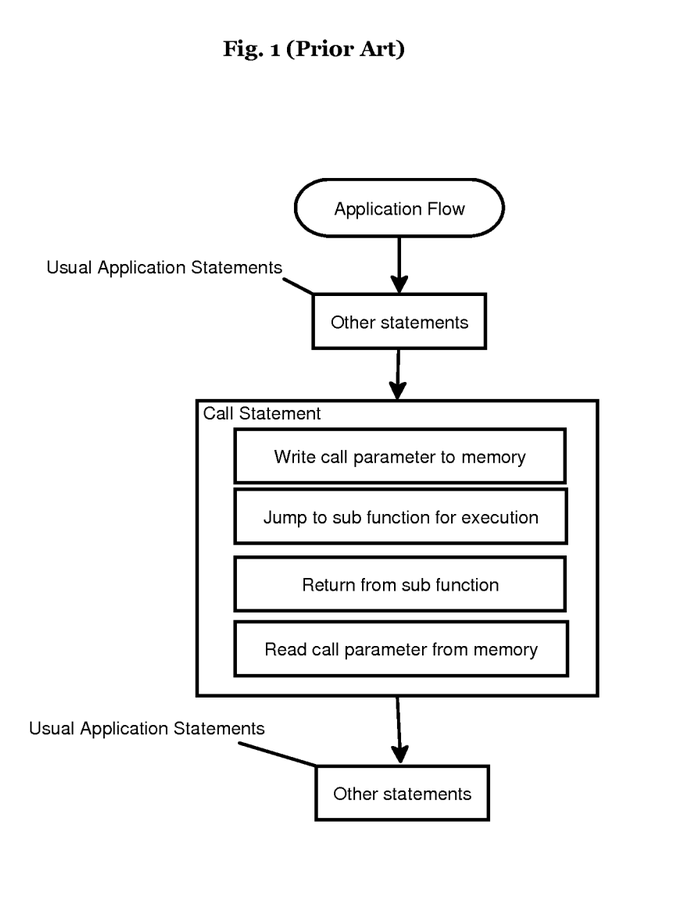
FIG. 1: A flowchart showing the processing steps performed during execution of a software application within a runtime environment of the prior art.

FIG. 1 shows the conventional flow of execution of a software application within a runtime environment. As it is known in the prior art, a software application, when executed in a runtime environment, typically jumps from one execution instruction to another execution instruction within the same application or to another application. These jump instructions are typically called "call", "callnat", "perform", "invokespecial", "invokeinterface", or the like (cf. the box "Call Statement" in FIG. 1) and will be commonly referred to as "function call" hereinafter. A function call conventionally stores data which is required for the target in the memory of the underlying system (cf. the box "Write call parameter to memory" in FIG. 1), and then jumps to a new location in the same application or into a different application (cf. the box "Jump to sub function for execution" in FIG. 1). At the new location, the data will be read from memory and is processed by the application. Thereafter, new data is typically stored in the memory as return value(s). Then the call instruction returns to the original location where it came from, where it reads the returned call parameters from memory (cf. the box "Read call parameter from memory" in FIG. 1). At the next step the new data can be used for the further execution of the application. The data involved in a function call will hereinafter be referred to as "function parameters".

Figure 2A:
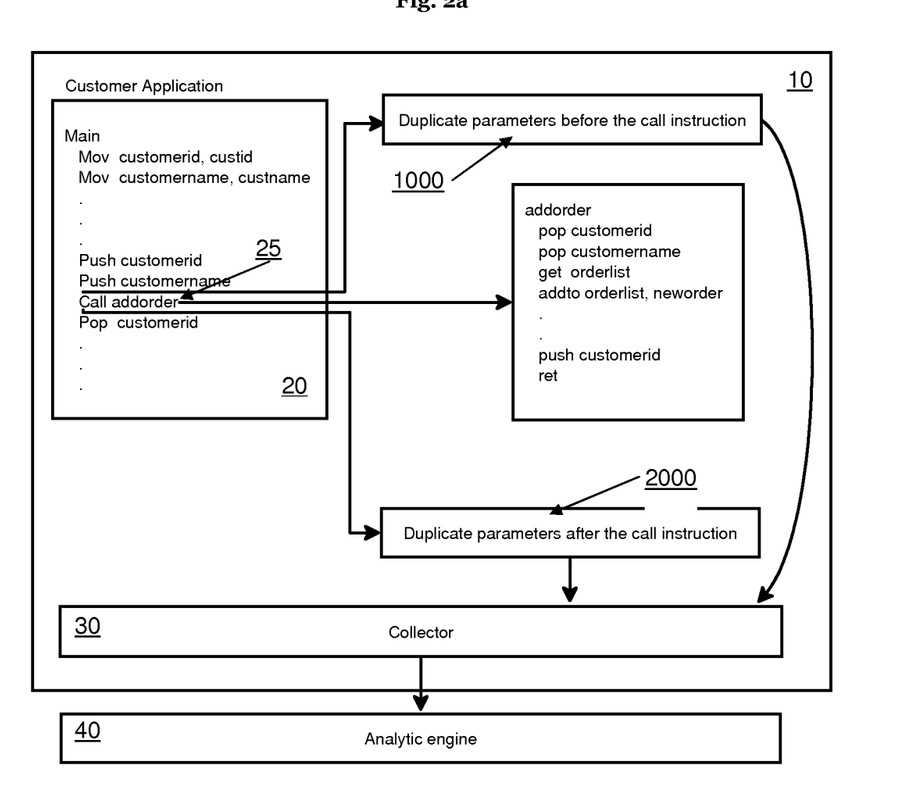
FIG. 2*a*: A schematic overview of a runtime environment with an external analytic engine in accordance with an embodiment of the present invention.
Figure 2B:
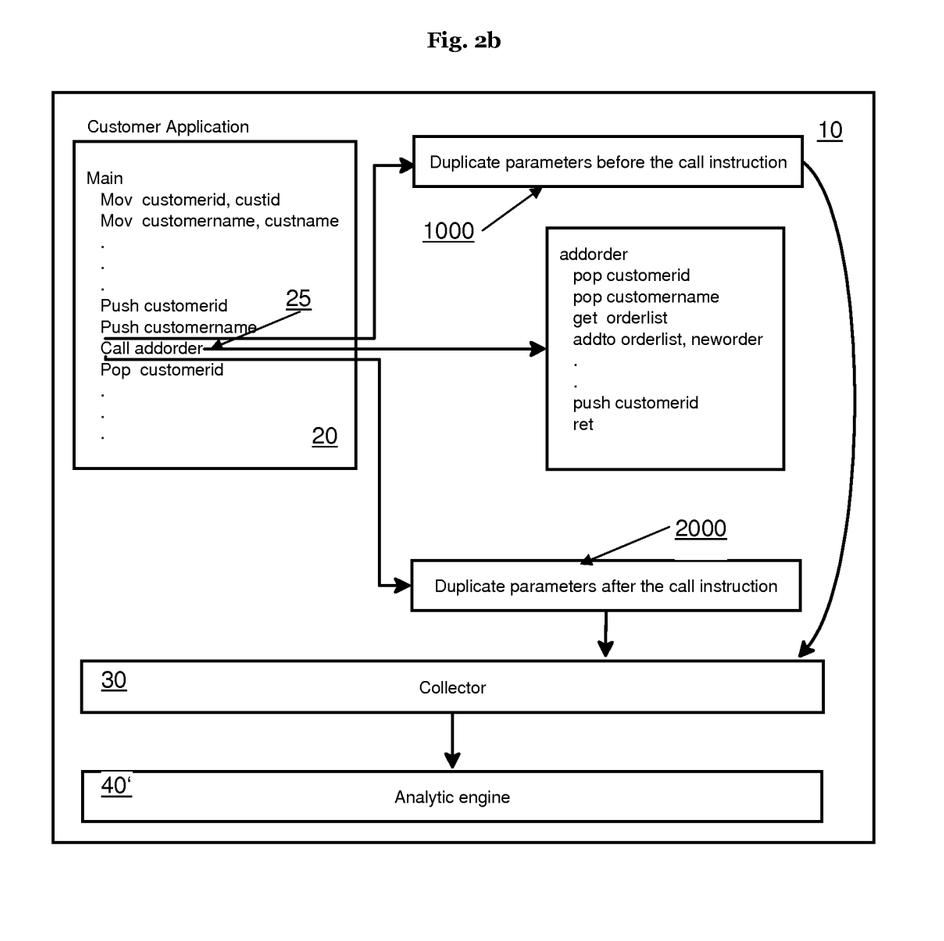
FIG. 2*b*: A schematic overview of a runtime environment with an internal analytic engine in accordance with an embodiment of the present invention.

An embodiment of the enhanced runtime environment of the invention will now be described with reference to FIG. 2a. As can be seen, the runtime environment to executes a software application 20, wherein the software application 20 comprises any number of operations. Somewhere during execution of the application 20 within the runtime environment to, a function call 25 (cf. "Call addorder" in FIG. 2a) will be the next operation of the application 20 to be executed. However, before the function call 25 is executed by the runtime environment to, the runtime environment to duplicates, i.e. generates a copy of at least part of, preferably all, function parameters involved in the function call 25 (cf. step 1000 in FIG. 2a). In the embodiment shown in FIG. 2a, the runtime environment to also generates a second copy of the function parameters after the function call 25 has been executed (cf. step 2000 in FIG. 2a). The duplicated function parameters are then forwarded, preferably with the information of the call target, via a collector 30 to an analytic engine 40. The collector 30 may be generally understood as an interface to the analytic engine 40, which can be an internal component 40' of the runtime environment to (as shown in FIG. 2b), or an external analytic engine 40, as shown in FIG. 2a. In a preferred embodiment of the invention, after extracting the parameter values and possibly other information (see below), the runtime environment to raises events to the analytic engine 40, 40', which may then act accordingly and perform the desired monitoring tasks based on the provided function parameter copies.

The analytic engine as internal component 40' (cf. FIG. 2b) is preferably a build-in engine with basic functionalities as described further above. The external analytic engine 40 can be enhanced with customer-specific extensions, e.g. plug-ins. The internal and external analytic engine may also be combined in other embodiments.

Figure 3:
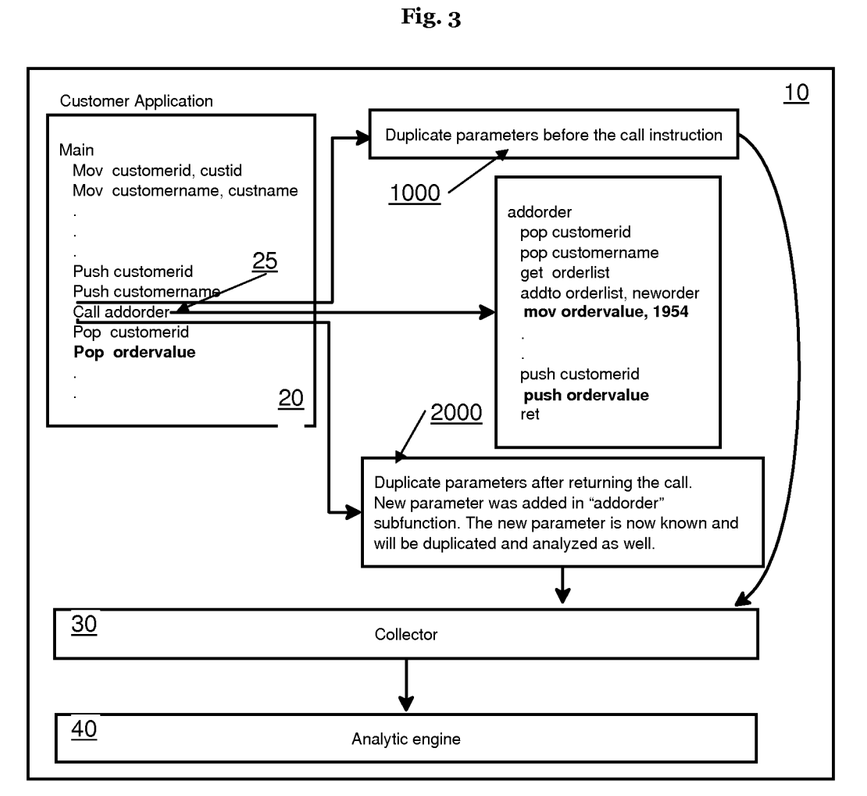
FIG. 3: A schematic overview of a runtime environment handling changed function parameters in accordance with an embodiment of the present invention.

Since the function parameters are preferably copied twice, i.e. once before the execution of the function call 25 and once thereafter, the overall system is able to handle changes of function parameters, such as types of parameters and/or the number of parameters of the function between the duplication performed before and after the function call. For example, FIG. 3 shows an embodiment in which the function call 25 of the software application 20 adds a new parameter (labeled "ordervalue, 1954" in FIG. 3). Although this parameter was not present before the function call 25 (and thus not comprised in the first function parameter copy), it is comprised in the second function parameter copy and can thus be made subject of further monitoring tasks.

The duplication of the function parameters may be controlled in the runtime environment to by means of certain filter properties, such as:
  function names, parameters for all functions calls or only configured function calls to be duplicated
  availability of specific parameter(s), parameters for function calls to be duplicated when a specific parameter is used
  values of specific parameter(s), parameter for function calls to be duplicated, e.g. when a value for (a) specific parameter(s) have been set or reaches a certain value (threshold), or if a specific parameter has a specific value, or if the value has been changed between the "before" and the "after" function call.
  properties in the execution runtime system, for example, but not limited to, client user identification, function call parameters to be duplicated when a specific client user performs the call
  any combination of the above Accordingly, it can be selected by means of the filter property which function calls 25 are made subject to the copying processes of the present invention.

Figure 4:
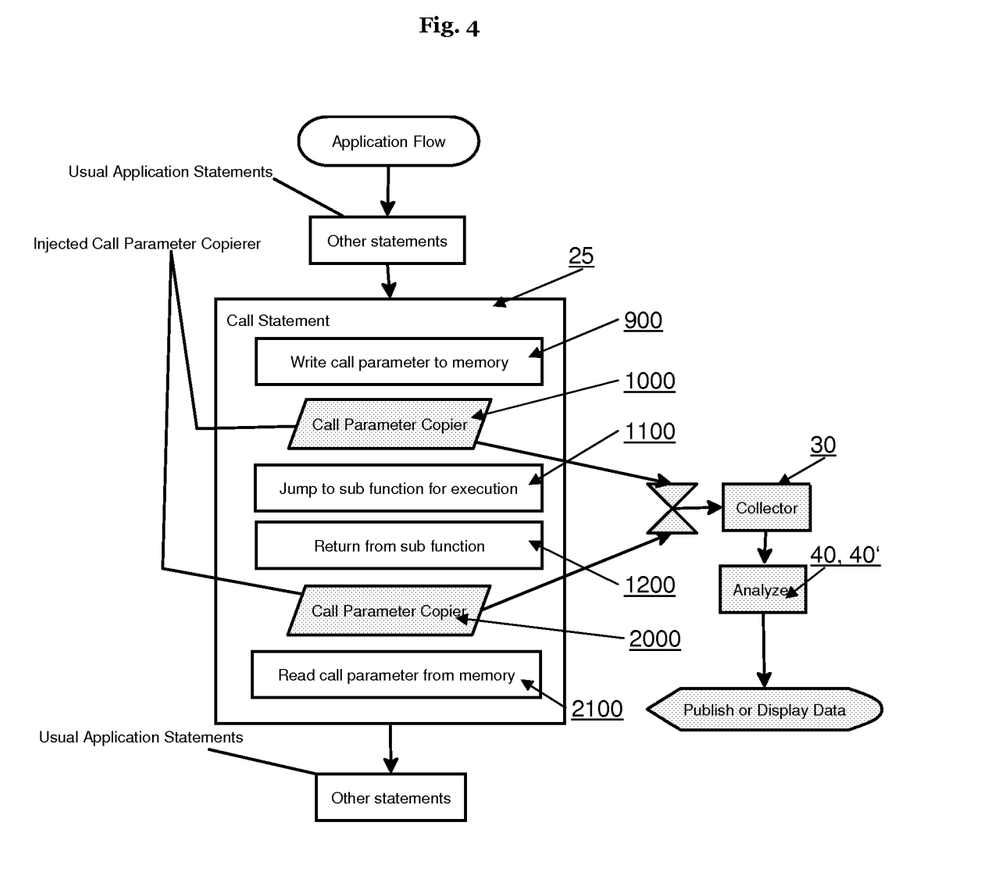
FIG. 4: A flowchart showing processing steps performed during execution of a software application within a runtime environment in accordance with an embodiment of the to present invention.

Furthermore, the data (i.e. function parameters) extracted from the function call 25 may be enriched with various additional information available in the runtime system 19, for example:
  a client user identification (i.e. an ID of the caller of the function call 25)
  a client TCP/IP address (and preferably a mapping of the address to a physical location)
  the date and time of "call" (i.e. a timestamp of the function call 25)
  the name of the "call" (i.e. the name of the function call 25)
  other predefined configuration parameters
  generated parameters (according the configuration) from the analytic engine
  any combination of the above FIG. 4 illustrates the application flow within a runtime environment to of the present invention, as compared to the prior art approach shown in FIG. 1. As can be seen in FIG. 4, when the runtime environment to executes a given function call 25, the function parameters are written into memory in step 900. Thereafter, i.e. still before the actual execution of the function call 25, the function parameters are copied in step 1000 and preferably immediately forwarded to collector 30. Then, the execution jumps in step 1100 to the (sub)function indicated by the function call 25. The execution flow returns in step 1200 from the (sub)function. Then, in step 2000, a second copy of the function parameters is generated and also forwarded to collector 30. As already explained above, collector 30 may forward the collected data to the analytic engine 40 for further processing and/or monitoring purposes.

In summary, the concept of the invention involves duplicating and forwarding data in the execution runtime of a programming language. The advantage for the user is to extract data from existing applications without any changes of the application's source code or a recompiling of the application. On the contrary, the desired data extraction is performed by the execution runtime to while executing certain instructions 25. As a result, the existing application 20 does not need to be changed at all and is ideally not even aware of the additional data collection.

In one exemplary use case, business process data is extracted by the execution runtime environment 10 (e.g. an enhanced ABAP execution engine, COBOL runtime, JAVA virtual machine and/or Natural runtime) during the runtime of a customer application 25. The desired business process data extraction will be done by the programming language runtime environment instruction "call" (or a comparable instruction in different programming languages). Typically, the "call" instruction will jump in the user application from the current instruction pointer to a different instruction pointer in the same application or to a different module outside of the current application. Usually the call instruction transports application data as call parameters. Each call parameter will be duplicated by the execution runtime environment 10 and forwarded to a receiver instance 30, 40, 40'. The parameter duplication step is handled by the execution runtime environment 10 only and the running user application 20 does not need any support for it.

In more detail, if the user application 20 executes the "call" instruction in the execution runtime environment to then each parameter data of the call 25 will be duplicated while entering the "call" instruction. At the end of the call instruction, i.e. while returning the "call" instruction, the data will be duplicated again. As described above, the reason for duplicating twice is because during the execution of the call instruction 25 it might be that the user application 20 (the origin receiver of the call) has changed the contents of the parameters. In this example, the content of the function parameter(s) of the "call" instruction contains business process data and the runtime environment to of the invention is enhanced to extract such business process data while the application 20 executes. The extracted business process data can then be forwarded to a process monitoring product as a second step.

It will be appreciated that the runtime environments described herein may be provided in connection with any suitable computer system or the like which may include, among other things, one or more processors, a memory, disk or other storage locations, etc., in a networked or non-networked environment. The applications may run on these and/or other systems, and the various processing steps may be implemented by the computer systems, etc. In certain example embodiments, programs for implementing the example embodiments described herein may be stored on non-transitory computer readable mediums and may be executed in connection with runtime environments and/or associated computer systems. In other words, the example embodiments described herein may be implemented in connection with any hardware, software, and/or firmware combination or sub-combination, etc., as would be appreciated by one skilled in the art.

What is claimed is:

1. A computer system comprising:
    at least one hardware processor and a memory, the at least one hardware processor configured to:
        provide a runtime environment for non-invasive monitoring of software applications;
        execute at least one software application within the provided runtime environment, the at least one software application including program instructions to be interpreted by the provided runtime environment being executed by the at least one hardware processor;
        during execution of the at least one software application within the runtime environment, automatically identify, via the provided runtime environment, a function call program instruction that is part of the at least one software application and that is to be executed within the provided runtime environment;
        in response to identification that the function call program instruction is to be executed within the provided runtime environment, create a copy of function call data associated with the function call program instruction, wherein the copy is created by the provided runtime environment without an explicit program instruction being included in the at least one software application;
        process the function call program instruction within the provided runtime environment by at least modifying a corresponding instruction pointer or program counter in accordance with the function call program instruction; and
        generate monitoring data relating to the automatically identified function call program instruction, the monitoring data including the created copy of the function call data.

2. The computer system of claim 1, wherein the generated monitoring data includes at least one of: an identifier of an entity calling the at least one function call program instruction, a memory address of the entity calling the at least one function call program instruction, a timestamp, and/or an identifier of the function call program instruction.

3. The computer system of claim 1, wherein the function call data includes at least one function parameter.

4. The computer system of claim 3, wherein, as part of executing the function call program instruction, the copy is created before the instruction pointer or program counter is modified.

5. The computer system of claim 4, wherein, in response returning from a function associated with the function call program instruction, create a second copy of the at least one function call parameter.

6. The computer system of claim 1, wherein the at least one processor is further configured to:
    send the generated monitoring data to an analytic engine for monitoring the at least one software application.

7. The computer system of claim 1, wherein the monitoring data is generated only if at least one predefined filter property that is monitored by the provided runtime environment is satisfied;
    wherein the at least one predefined filter property includes at least one of: an identifier of a function call associated with the function call program instruction, whether a specific function parameter is present in the function call, and/or whether a specific function parameter has a predefined value.

8. The computer system of claim 1, wherein the copy is created by copying the function call data from the memory that is addressable by the at least one processor.

9. The system of claim 1, wherein the at least one processor is further configured to automatically determine whether a function parameter associated with the function call program instruction was changed and/or added as a result of the function being executed within the runtime environment.

10. A method for non-invasive monitoring of software applications operating in a computer system including at least one processor and a memory cooperating to provide a runtime environment for non-invasive monitoring of software applications on the computer system, the method comprises comprising, in connection with the runtime environment:

executing, by using the computer system, at least one software application within the provided runtime environment, the at least one software application including program instructions to be interpreted by the provided runtime environment being executed by the at least one processor;

during execution of the at least one software application within the runtime environment, automatically identifying, via the provided runtime environment, a selected program instruction that is part of the at least one software application and that is to be executed within the provided runtime environment;

in response to identification that the selected program instruction is to be executed within the provided runtime environment, creating a copy of data associated with how the selected program instruction is to be executed, wherein the copy is created by the provided runtime environment without an explicit copy program instruction being included in the at least one software application;

processing the selected program instruction within the provided runtime environment; and generating monitoring data relating to the automatically identified program instruction, the monitoring data including the created copy, wherein the selected program instruction is a function call program instruction that calls a function that is part of the at least one software application, and wherein processing the function call program instruction includes modifying a corresponding instruction pointer or program counter in accordance with the function call program instruction.

11. The method of claim 10, wherein the monitoring data includes at least one of: an identifier of the entity calling the at least one function call, an address of the entity calling the at least one function call, a timestamp, and/or an identifier of the function call.

12. The method of claim 10, wherein the copy of data associated with how the selected program instruction is to be executed includes a copy of the at least one function parameter associated with the function call program instruction.

13. The method of claim 10, wherein, as part of executing the function call program instruction, the copy is created before the instruction pointer or program counter is modified.

14. The method of claim 13, further comprising:
generating a second copy after the function call has been executed.

15. The method of claim 10, wherein the monitoring data is generated only if at least one predefined filter property is satisfied, wherein the at least one predefined filter property includes at least one of: an identifier of a function call associated with the function call program instruction, whether a specific function parameter is present in the function call, and/or whether a specific function parameter has a predefined value.

16. A non-transitory computer readable storage medium storing a computer program for use with a computer system that includes at least one processor coupled to a memory, the computer program comprising instructions that cause the computer system to:

provide a runtime environment, on the computer system, for at least monitoring software applications that are being executed on the computer system;

execute at least one software application within the provided runtime environment, the at least one software application including program instructions to be interpreted by the provided runtime environment being executed by the at least one processor;

during execution of the at least one software application within the runtime environment, automatically identify, via the provided runtime environment, a program instruction that is part of the at least one software application and that is to be executed within the provided runtime environment;

in response to identification that the program instruction is to be executed within the provided runtime environment, create a copy of data associated with how the program instruction is to be executed, wherein the copy is created by the provided runtime environment without an explicit copy program instruction being included in the at least one software application;

process the program instruction within the provided runtime environment; and generate monitoring data relating to the automatically identified program instruction, the monitoring data including the created copy, wherein the program instruction is a function call program instruction that calls a function that is part of the at least one software application, and wherein processing the function call program instruction includes modification of a corresponding instruction pointer or program counter in accordance with the function call program instruction.

* * * * *

UNITED STATES PATENT AND TRADEMARK OFFICE
CERTIFICATE OF CORRECTION

| | | |
|---|---|---|
| PATENT NO. | : 9,032,372 B2 | Page 1 of 1 |
| APPLICATION NO. | : 13/591760 | |
| DATED | : May 12, 2015 | |
| INVENTOR(S) | : Münster et al. | |

It is certified that error appears in the above-identified patent and that said Letters Patent is hereby corrected as shown below:

In the Specification

Column 5, line 36-37, change "runtime environment to, a function call" to

--runtime environment 10, a function call--

Column 5, line 55, change "the runtime environment to raises events to the analytic" to --the runtime environment 10 raises events to the analytic"--

Column 6, line 12, change "trolled in the runtime environment to by means of certain" to --trolled in the runtime environment 10 by means of certain--

Column 7, line 25, change "instruction in the execution runtime environment to then each" to --instruction in the execution runtime environment 10 then each--

Column 7, line 35, change "environment to of the invention is enhanced to extract such" to --environment 10 of the invention is enhanced to extract such--

Signed and Sealed this
Fifteenth Day of September, 2015

Michelle K. Lee
*Director of the United States Patent and Trademark Office*